(12) United States Patent
Debuisschert

(10) Patent No.: US 7,298,848 B2
(45) Date of Patent: Nov. 20, 2007

(54) QUANTUM CRYPTOGRAPHY TRANSMISSION METHOD AND SYSTEM

(75) Inventor: Thierry Debuisschert, Orsay (FR)

(73) Assignee: Thales, Neuilly-sur-Seine (FR)

( * ) Notice: Subject to any disclaimer, the term of this patent is extended or adjusted under 35 U.S.C. 154(b) by 699 days.

(21) Appl. No.: 10/416,187

(22) PCT Filed: Nov. 9, 2001

(86) PCT No.: PCT/FR01/03500

§ 371 (c)(1),
(2), (4) Date: Oct. 28, 2003

(87) PCT Pub. No.: WO02/39639

PCT Pub. Date: May 16, 2002

(65) Prior Publication Data

US 2004/0062396 A1   Apr. 1, 2004

(30) Foreign Application Priority Data

Nov. 10, 2000   (FR) .................................. 00 14488

(51) Int. Cl.
*H04K 1/00*   (2006.01)
(52) U.S. Cl. .................................... 380/256
(58) Field of Classification Search ...................... None
See application file for complete search history.

(56) References Cited

U.S. PATENT DOCUMENTS

| | | | | |
|---|---|---|---|---|
| 4,376,637 A | * | 3/1983 | Yang | 95/74 |
| 4,713,689 A | * | 12/1987 | Veillard | 348/727 |
| 4,962,530 A | * | 10/1990 | Cairns | 713/183 |
| 5,140,636 A | * | 8/1992 | Albares | 380/54 |
| 5,243,649 A | * | 9/1993 | Franson | 380/256 |
| 5,307,410 A | * | 4/1994 | Bennett | 380/256 |

(Continued)

FOREIGN PATENT DOCUMENTS

EP   887967 A1 * 12/1998

(Continued)

OTHER PUBLICATIONS

Rauch, H., et al, "Time-of-flight neutron interferometry," Physical Review A (Atomic Molecular and Optical Physics), vol. 46, No. 1, Jul. 1, 1992, p. 49-57.*

(Continued)

*Primary Examiner*—Gilberto Barron
*Assistant Examiner*—Devin Almeida
(74) *Attorney, Agent, or Firm*—Lowe Hauptman Ham & Berner, LLP

(57) ABSTRACT

Quantum cryptography by polarization ambiguity is generally used but it involves polarization-maintained fibers. This invention proposes an alternative: quantum cryptography by ambiguity in time. It comprises the conversion of K bits to be transmitted into a train of K pulses of particle flows of time width $\Delta T$ and whose frequency Tb, is predetermined knowing that each of the K pulses being shifted or not in time such that the $k^{th}$ pulse is shifted by a duration t0 respectively t1, with respect to the initial instant of the period depending on the value "0", respectively "1" of the $k^{th}$ bit, where k is an integer such that $0 \leq k < K$ and the shifts t0 and t1 are such that $0 \leq t0, t1 \leq Tb - \Delta T$ and $0 < |t1 - t0| < \Delta T$.

22 Claims, 4 Drawing Sheets

U.S. PATENT DOCUMENTS

| | | | |
|---|---|---|---|
| 5,515,438 A * | 5/1996 | Bennett et al. | 380/278 |
| 5,675,648 A * | 10/1997 | Townsend | 380/278 |
| 5,757,912 A * | 5/1998 | Blow | 380/256 |
| 5,768,378 A * | 6/1998 | Townsend et al. | 380/256 |
| 5,953,421 A * | 9/1999 | Townsend | 380/283 |
| 6,127,940 A * | 10/2000 | Weinberg | 340/825.69 |
| 6,314,189 B1 * | 11/2001 | Motoyoshi et al. | 380/278 |
| 6,438,234 B1 * | 8/2002 | Gisin et al. | 380/256 |
| 6,480,283 B1 * | 11/2002 | Williams et al. | 356/450 |
| 6,529,601 B1 * | 3/2003 | Townsend | 380/256 |
| 6,539,410 B1 * | 3/2003 | Klass | 708/255 |
| 6,636,566 B1 * | 10/2003 | Roberts et al. | 375/247 |
| 6,668,006 B1 * | 12/2003 | Margalit et al. | 372/97 |
| 6,778,669 B1 * | 8/2004 | Lehureau | 380/256 |

FOREIGN PATENT DOCUMENTS

| | | | |
|---|---|---|---|
| WO | WO-97/44936 | * | 11/1997 |

OTHER PUBLICATIONS

Bennett, Charles, "Quantum Cryptography Using Any Two Nonorthogonal States," Physical Review Letters, v. 68, n. 21, May 25, 1992, pp. 3121-3124.*

Bennett, Charles et al, "Quantum Cryptography," Scientific American, Oct. 1992, pp. 50-57.*

Patarasen, S. et al, "Maximum-likelihood symbol synchronization and detection of OPPM sequences," IEEE Transactions of Communications, vol. 42, No. 6, Jul. 1, 1994, pp. 2282-2290.*

Voudas, A., et al, "Pulse Position Modulation and Extended Pulse Position Modulation with Squeezed Light," Journal of Modern Optics, vol. 41, No. 12, Dec. 1, 1994, pp. 2191-2299.*

* cited by examiner

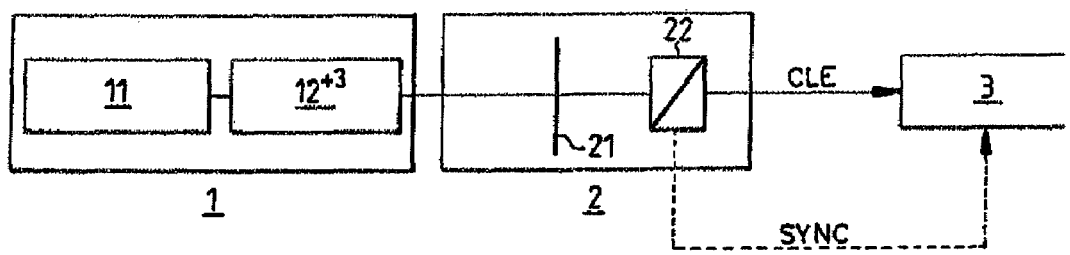
FIG. 10
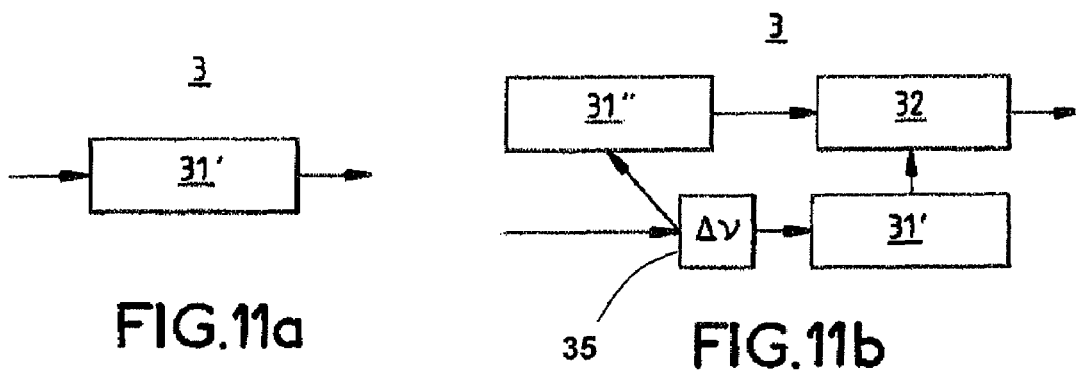
FIG. 11a
FIG. 11b
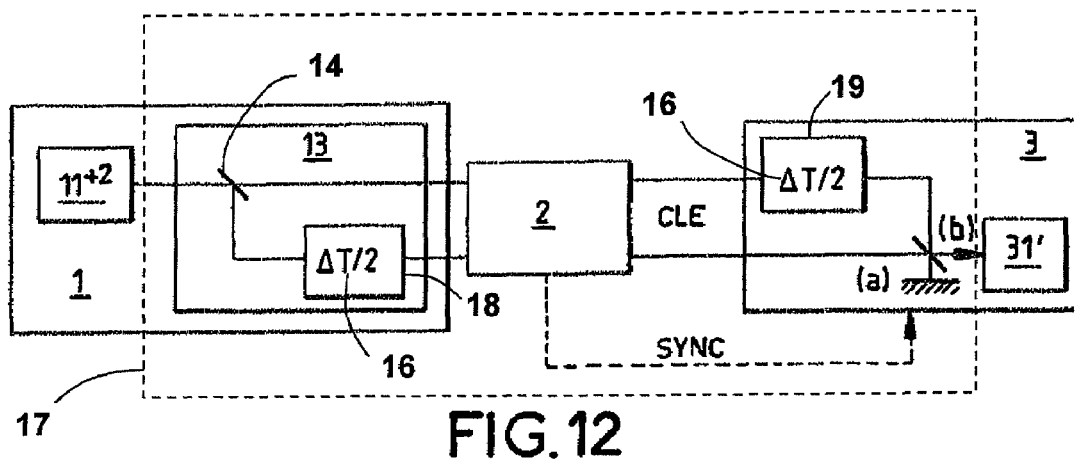
FIG. 12

QUANTUM CRYPTOGRAPHY TRANSMISSION METHOD AND SYSTEM

FIELD OF THE INVENTION

The invention concerns the field of cryptography.

RELATED APPLICATIONS

The present Application is based on International Application No. PCT/FR01/03500 filed on Nov. 9, 2001, which in turn corresponds to French Application No 00/14488 filed on Nov. 10, 2000 and priority is hereby claimed under 35 USC § 119 based on these applications. Each of these applications are hereby incorporated by reference in their entirety into the present application.

BACKGROUND OF THE INVENTION

Through the use of cryptography, a message can only be read by its recipient. A key is used to encrypt the message. The owner of the key is the only person who can read the message received.

The encryption key must therefore be transmitted by the sender to the recipient of the encrypted message. Transmission is carried out such that only the recipient of the encrypted message receives this encryption key. Interception by a third party of the encryption key is detected by the sender or the recipient. Consequently, the encryption key or the elements of the key detected as having been intercepted are not used to encrypt the message.

The principle of transmitting encryption keys is used, for example, in quantum cryptography. It consists of using physical properties to guarantee the integrity of a received encryption key.

The encryption key consists of a bit sequence. Generally, a photon polarization state is associated with each bit. The light flow, encoded by polarization, is then attenuated. The probability of detecting two photons associated with the same bit is then negligible.

The sender can encode the encryption key on two non-orthogonal states (a given polarization state and a state at 45°). Concerning this subject, Bennett wrote the article "Quantum Cryptography using any two Nonorthogonal states" in Physics Review letters 68 in 1992. In reception, the detection states are chosen in a base with two states. These two detection states are orthogonal respectively to each state of the base used by the sender. During transmission, the transmission and detection states are chosen independently of each other.

If the states chosen by the transmitter and the receiver are orthogonal, the detection probability is zero. The measurement result is certain, there is no ambiguity. If they are not orthogonal, there are two possible measurement results since the probability of detecting the photon is 0.5. If the photon is detected, it is certain that the transmitter state is at 45° to the receiver state. There is no ambiguity. Irrespective of the polarization configuration, there is always a possibility of not detecting the photon. This non detection of the photon makes deducing the choice of transmitter polarization, using the receiver state, ambiguous.

This ambiguity concerning the polarization is used in quantum cryptography. A non recipient cannot reproduce the message since it is impossible to avoid losing information.

This type of quantum cryptography is known as "polarization ambiguity quantum cryptography" since it uses photon polarization states. A certain number of problems are to be faced. They concern the encoding of the encryption key on the polarization states of the photons in a light flow. During transmission, there is a problem of polarization distortion. For example, transmission by optical fibers requires complex systems which are difficult to implement and very expensive. For example,
- either the use of polarization-maintained fibers, which are expensive and difficult to implement,
- or the use of complex systems implementing, for example, Faraday rotators.

SUMMARY OF THE INVENTION

This invention proposes an alternative: quantum cryptography by ambiguity in time. It is easier to implement since protected, amongst other things, against problems of transmission by optical fibers. Two photons transmitted successively with a time difference $\Delta t$ will be received in the transmission order with the same time difference $\Delta t$, independently of the transmission medium.

The invention concerns a digital data encoding method intended for transmission by particle flow such that the probability of transmitting two particles per period is negligible, wherein it includes the transformation of the sequence of K bits of digital data in a train of K pulses of particle flows of time width $\Delta T$ whose frequency Tb is predetermined, knows that each of the K pulses being shifted or not in time such that the $k^{th}$ pulse is shifted by a duration t0, respectively t1, with respect to the initial instant of the period depending on the value "0", respectively "1" of the $k^{th}$ bit, where k is an integer such that $0 \leq k < K$ and the shifts t0 and t1 are such that $0 \leq t0, t1 \leq Tb - \Delta T$ and $0 < |t1-t0| < \Delta T$.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The invention proposes a method to decode digital data encoded according to the procedure wherein, given $\Delta t = \Delta T - |t1-t0|$, it comprises:
- observation of the flow of particles received on one or two time windows for each bit reception period of duration Tb,
- detection of particles in the time observation window(s) generates either a bit of value "0" or "1", or a signal indicating ambiguity.

The advantages and features of the invention will be clearer on reading the following description, given as an example, illustrated by the attached figures representing in.

DETAILED DESCRIPTION OF THE EMBODIMENTS

The principle of this invention is based on the reproduction of the state of the art polarization ambiguity arrangement in the time domain.

Figure 1:
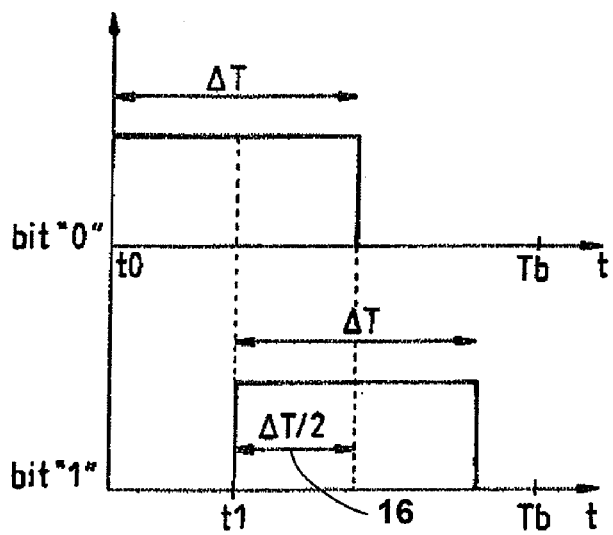
FIG. 1, the representation of the value of a bit transmitted as a pulse according to the invention, FIG. 2, the time observation windows of the decoder according to the invention, FIG. 3(a), a first example of realization of a second variant of the encoder 1 according to the invention, FIG. 3(b), the representation of the value of a bit to be transmitted as control signal of the modulator included in the encoder 1 of FIG. 3(a).
Figure 2:
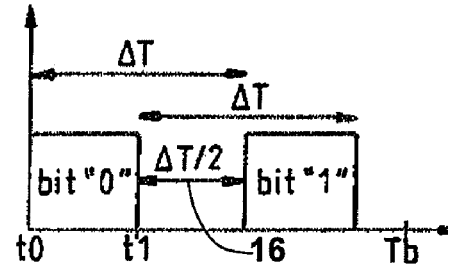

The information is encoded in pulses of time width $\Delta T$ as shown on FIG. 1. These pulses may, for example, be light pulses. Generally, they may be pulses of particle flows (photons, electrons, positrons, etc.). The transmitter produces two types of pulse, representing t0 and t1, respectively separated by a time shift of, for example, $|t1-t0|=\Delta T/2$ 16. One bit of the digital data representing the information to be encoded is associated with each time period of duration Tb. One of the pulses is associated with the bit of value "0" (that shifted by t0 with respect to the initial instant of the period of duration Tb), the other with the bit of value "1" (that shifted by t1). The duration Tb is such that it satisfies the following relation $Tb \geq \Delta T+|t1-t0|$. The two pulses are shifted so that they overlap for a time interval $\Delta t=\Delta T-|t1-t0|$ ($=\Delta T/2$ 16, in our example) >0. On the example of FIG. 1, the pulse associated with the bit of value "1" is delayed with respect to the pulse associated with the bit of value "0" and t0=0. Generally, t0 and t1 are such that $0 \leq t0, t1 \leq Tb-\Delta T$ and $0<|t1-t0|<\Delta T$. If the receiver detects a photon during the period of overlap, it cannot know which type of pulse it comes from, and consequently the value "0" or "1" of the bit which was transmitted. To detect the bit value unambiguously, only the photons received in the two time windows given on FIG. 2 are observed. One window is used to observe the first half of the first pulse and the other the second half of the second pulse. Consequently, the photons reaching the receiver during the overlap interval $\Delta t$ are not observed.

More explicitly, the decoding comprises:
observation of the flow of particles received on one or two time windows for each bit reception period of duration Tb,
if t0<t1, the first time observation window starts at instant t0 (inclusive) and ends at instant t1 (exclusive), the second observation window starts, if necessary, at instant t1+$\Delta$t (exclusive) and ends at instant t1+T (inclusive) or vice versa,
if t1<t0, the first time observation window starts at instant t1 (inclusive) and ends at instant t0 (exclusive), the second observation window starts, if necessary, at instant t0+$\Delta$t (exclusive) and ends at instant t0+T (inclusive) or vice versa,
detection of particles in the time observation window(s) generates:
a bit of value "0":
if t0<t1, when a particle is detected in the window starting at t0 of period k,
if t1<t0, when a particle is detected in the window starting at t0+$\Delta$t of period k,
a bit of value "1":
if t1<t0, when a particle is detected in the window starting at t1 of period k,
if t0<t1, when a particle is detected in the window starting at t1+$\Delta$t of period k,
a signal indicating an ambiguity on the bit value if no particle was detected in the first, and if necessary, in the second observation window.

In our example, the bits are transmitted according to the format of FIG. 1 and the observation windows of the receiver are given by FIG. 2.

The particle flow pulses carrying the information to be transmitted in time shifted format are, for example:

[ENCODER A] Either produced directly by an encoded pulse source $11^{+3}$ (for example, a laser generating a discontinuous laser beam according to the diagram of encoded pulses shown on FIG. 1),

[ENCODER B] Or shifted in time by t0 or t1 depending on the data to be encoded by a controllable delay gate 13 receiving a particle pulse flow from a pulse source $11^{+2}$,

[ENCODER C] Or chopped with the appropriate time shift (t0 or t1) depending on the data to be encoded by an encoded pulse chopper $12^{+3}$ at frequency Tb in a continuous beam from a laser 11,

[ENCODER D] Or chopped by a pulse chopper 12 at frequency Tb in a continuous beam from a source 11 then given a time shift of t0 or t1 depending on the data to be encoded by a controllable delay gate 13, The various encoders 1 and decoders 3 considered on FIGS. 3 to 12 are given as examples. They illustrate encoding on light beam. More generally, any type of particle flow (photons, electrons, positrons, etc.) may be considered.

[ENCODER A] The first variant of encoder 1 is not illustrated. Encoder 1 includes at least one encoded pulse source $11^{+3}$. It produces particle flow pulses of time width $\Delta T$ and frequency Tb. In addition, the pulses from this source are shifted by t0 or t1 depending on the value of the data bits to be encoded. The values of the time shifts t0 and t1 are such that $0 \leq t0, t1 \leq Tb-\Delta T$ and $0<|t1-t0|<\Delta T$. In our example, the source $11^{+3}$ is a laser, for example a mode-locked laser producing light pulses according to the diagram on FIG. 1 with t0=0.

Figure 4:
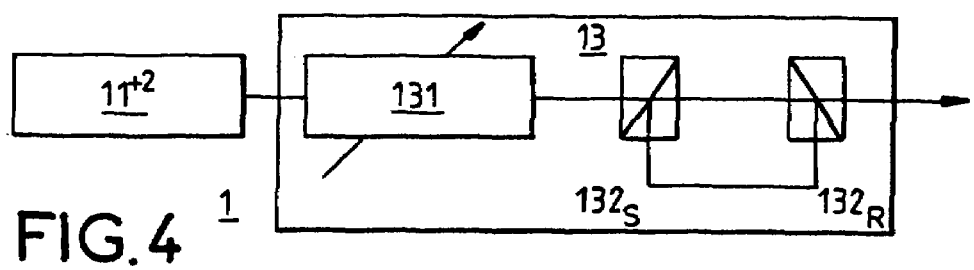
FIG. 4, a third variant of the encoder 1 according to the invention.

[ENCODER B] FIG. 4 shows a second variant of encoder 1 using a modulator 131. Modulator 131 is electro-optical or acousto-optical, etc. Encoder 1 includes a pulse source $11^{+2}$. This source $11^{+2}$ generates a particle flow as a train of pulses of time width $\Delta T$ and frequency Tb. The pulse source $11^{+2}$ is, for example, a mode-locked laser. Mode-locked lasers produce pulse trains separated by a constant time interval equal to the time for the back and forth movement in the laser cavity. It is difficult to control the laser in order to produce the time shifts required depending on the bits to be encoded. Consequently, in the variant proposed by FIG. 4, these shifts are produced outside the laser $11^{+2}$ using a controllable delay gate 13. The delay gate 13 makes the pulses follow or not a delay line according to the shift required and determined by the bits to be encoded. This type of delay gate 13 can be produced, for example, using a modulator 131 to switch the polarization between two directions specific to the polarizing prisms $132_S$ and $132_R$ placed downstream. Polarizing prism $132_S$ guides the pulses depending on their polarizations to a first or a second path. The second polarizing prism $132_R$ brings them back to the output of the delay gate 13. Depending on the path followed by the pulses, the distance traveled is more or less long. For example, if the pulse is not shifted, if follows a direct path and if it is shifted, it follows an elongated path.

Figure 3A:
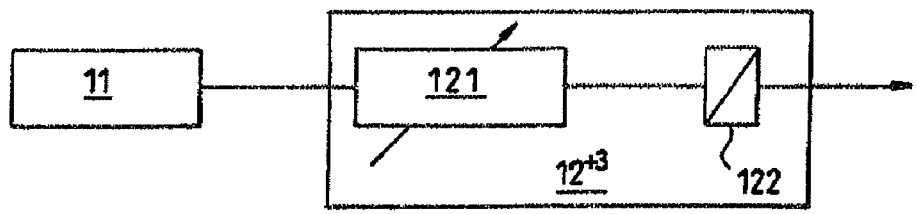
Figure 3B:
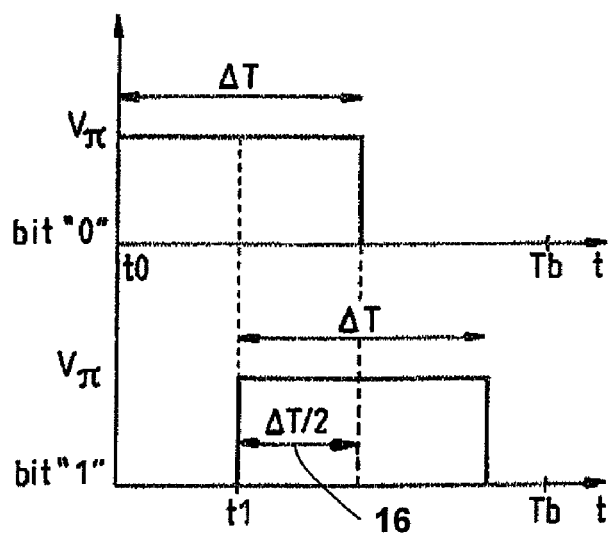

[ENCODER C] The first example of realization of the third variant of encoder 1 shown on FIG. 3(a) is simple. The beam generated by the laser 11 goes through a modulator 121. Modulator 121 has two operating modes: active mode and inactive mode. It can be electro-optical, acousto-optical, etc. Modulator 121 receives a control signal which has two states. One state corresponds to inactive mode, the other state to active mode. FIG. 3(b) shows the control voltage of an electro-optical modulator 121. It is designed to create pulses of time width ΔT at frequency Tb with a time shift t0 or t1 depending on the value "0" or "1" of the bits. When the control voltage reaches a threshold value Vπ, modulator 121 is active. Modulator 121 in active state switches the polarization of the light beam passing through it by 90°. A polarizer 122 is placed downstream from modulator 121. Polarizer 122 switches off the beam when modulator 121 is not active. In fact, polarizer 122 only allows the beam to pass when its polarization corresponds to that obtained at the output of modulator 121 when active. When idle therefore, no beam is transmitted by the encoded pulse chopper $12^{+3}$.

This first example of realization of the third variant of encoder 1 therefore includes a source 11 producing a continuous flow of particles followed by an encoded pulse chopper $12^{+3}$ with at least one modulator 121 receiving the continuous flow, and a polarizer 122 to allow transmission only during the recorded pulse.

Another technique consists of using a mechanical chopper 123 which chops pulses of given time width ΔT at the desired frequency Tb on a continuous particle flow.

Figure 5:
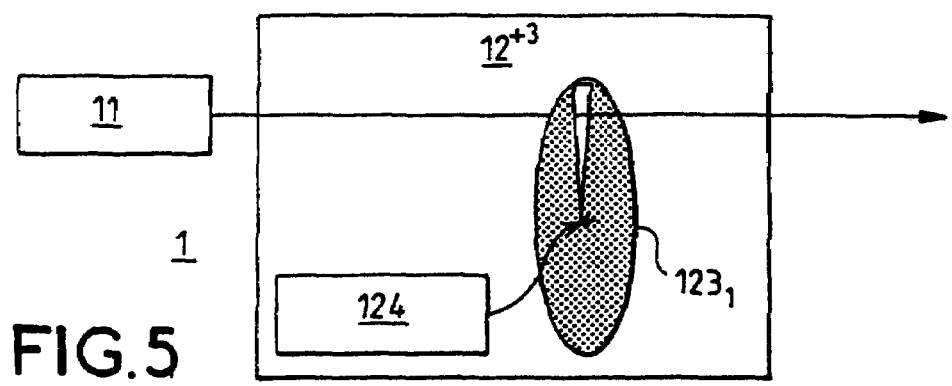
FIG. 5, a second example of realization of the second variant of the encoder 1 according to the invention, FIG. 6, the disc of the mechanical chopper of the third and fourth examples of realization of the second variant of the encoder 1 according to the invention, FIG. 7(a), a third example of realization of the second variant of the encoder 1 according to the invention, FIG. 7(b), a representation of the light flow at the input of the modulator of the encoder 1 of FIG. 6.

FIG. 5 shows a second example of realization of the third variant of encoder 1. It uses a mechanical chopper whose disc $123_1$ has only one opening. A phase check device 124 generates a voltage (VCO) to command the speed of rotation of the disc $123_1$. Varying the control voltage dephases more or less the disc rotation and therefore shifts by a duration t0 or t1 the creation of a pulse in the beam from laser 11.

Figure 6:
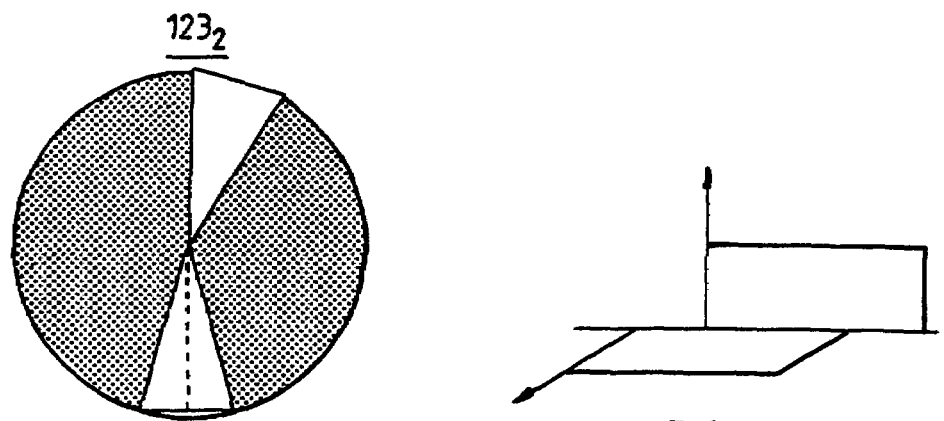

A disc $123_2$ with two openings like that shown on FIG. 6 can be used to avoid having to check the disc rotation phase. So that the pulses have the same shape and same duration T, the two openings have identical shapes (triangles, squares, rectangles, etc.). In addition, they are diametrically opposed and shifted by ½ an opening. The two pulses created are therefore shifted by half a width. The advantage is to provide the shift of ΔT/2 independently of the disc rotation spectral width. For a shift other than ΔT/2, the shift is no longer ½ an opening but adapted to the required time shift.

Figure 7B:
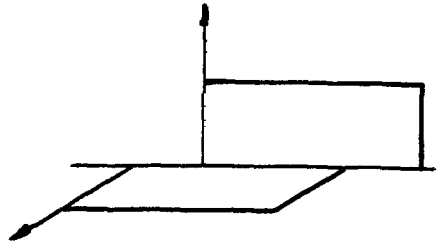
Figure 7A:
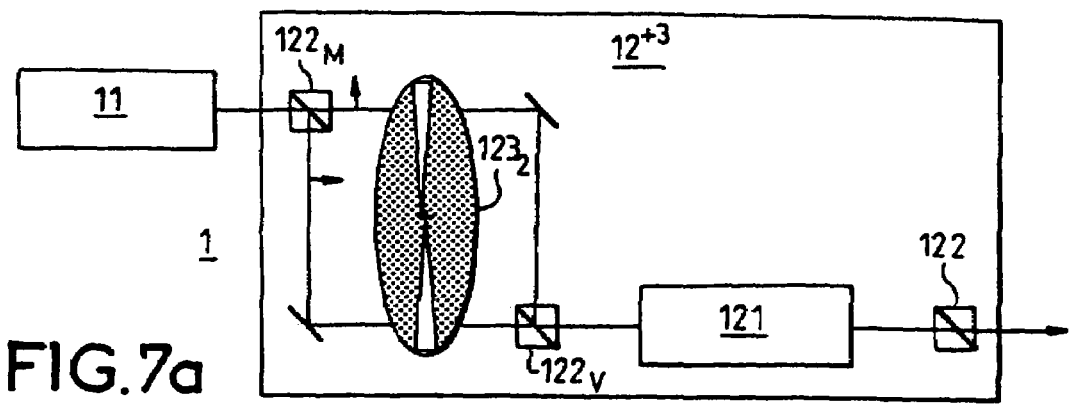
Figure 8:
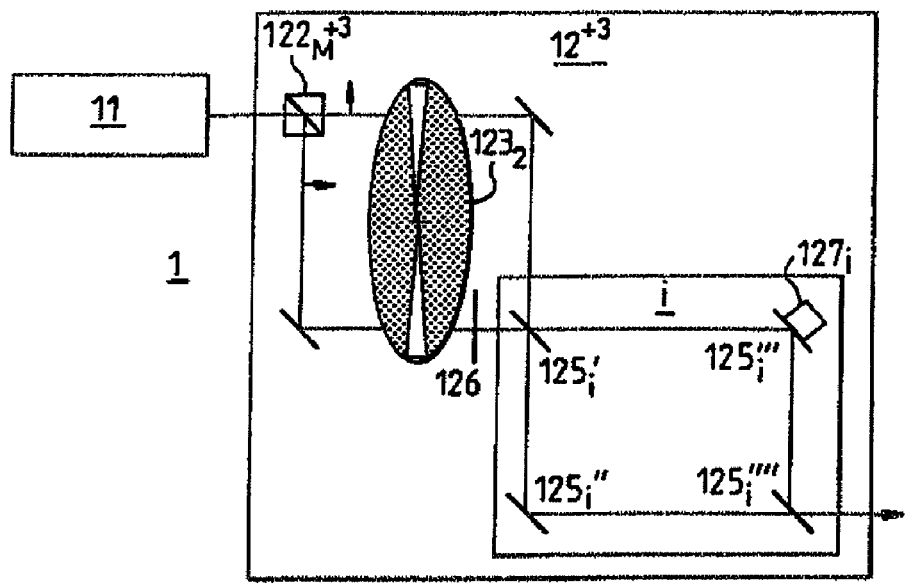
FIG. 8, a fourth example of realization of the second variant of the encoder 1 according to the invention, FIGS. 9(a) and 9(b), the Mach-Zender interferometer of encoder 1 of FIG. 8 in its two different states, FIG. 10, a first example of realization of the quantum cryptography transmission system according to the invention, FIGS. 11 (a) and 11 (b), two variants of the decoder according to the invention, FIG. 12, a second example of realization of the quantum cryptography transmission system according to the invention.
Figures 9A, 9B:
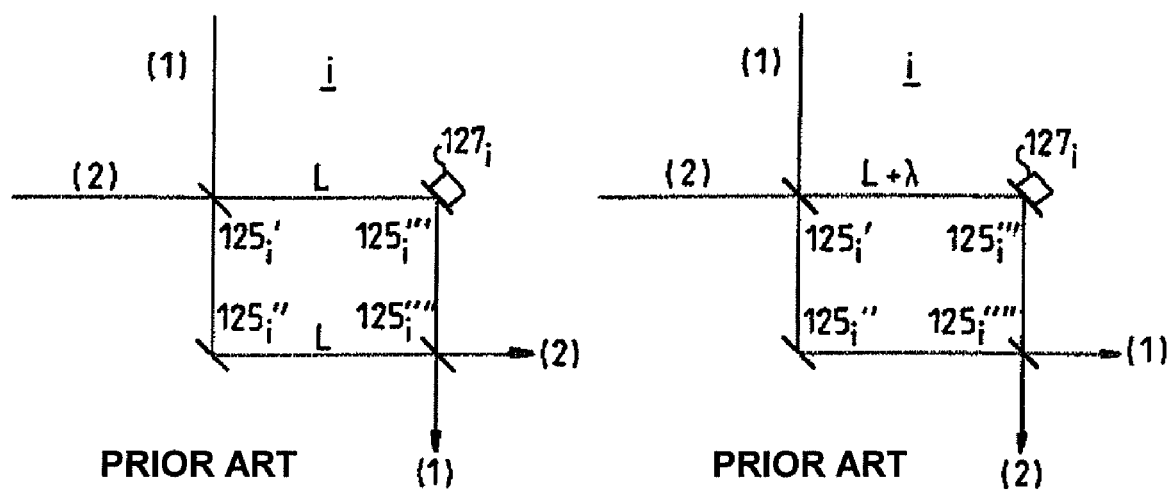

The two pulses are created on two separate beams since they have orthogonal polarizations, as shown on FIGS. 7(a) and 8. To do this, the beam from laser 11 is split into two beams. The polarizations of these two beams are orthogonal. This separation is produced, for example, with a polarizing prism $122_M$. Disc $123_2$ is positioned so that one beam crosses one of the openings directly. The other beam is guided to the other opening using, for example, a mirror 125''. One of the beams then has pulses at instants t1 and the other beam has pulses at instants t0. To encode data, one or other of the two pulses must then be chosen.

The third example of realization of the third variant of encoder 1 shown on FIG. 7(a) proposes a first pulse selection device. The two beams are recombined after passing through disc $123_2$. A repolarizing cube $122_V$ is used to perform this recombination. It is placed on the path of one of the beams. The other beam is guided to the repolarizing cube $122_V$ using, for example, a mirror 125'. The recombined beam has the two pulse types t0 and t1 each on a given polarization as shown on FIG. 7(b). The selection device is placed on the light beam resulting from the recombination. It includes, for example, a modulator 121 which is activated or not depending on the pulse selected. The modulator 121 places the selected pulses corresponding to the data to be encoded on a given polarization. The selection device then only allows the polarization containing the selected pulses to pass, by using a polarizer 122.

The selection device described by the fourth example of realization of the third variant of encoder 1 on FIG. 8 is produced using another technique. It is an optical routing technique. It uses, for example, a Mach-Zender interferometer i set to zero step difference. The interferometer has two input and output channels that are arranged in a known configuration as shown on FIGS. 9(a) and 9(b). Depending on the dephasing introduced in one arm of the interferometer (e.g. 0 for t0 or π for t1), one of the input channels is connected to one of the output channels. This dephasing is easy to achieve by mounting one of the mirrors $125_i'''$ on a piezo-electric block $127_i$. This is used to elongate the length of one arm by a distance equal to one wavelength. A half-wave plate 126 can be used on one of the input channels of the interferometer i. The polarizations of the two beams are then identical at the input of the interferometer i.

The examples of realization of the third variant of encoder 1 on FIGS. 7 and 8 show an encoded pulse chopper $12^{+3}$ which has a given structure. The encoded pulse chopper $12^{+3}$ includes at least one particle flow separator $122_M$ on two channels. A chopper 123 as such is used to chop on the particle flow pulses shifted by t0 on the first channel and by t1 on the second channel. A device (121+122 or i) is used to select at each period the pulse shifted by t0 or by t1 depending on the value "0" or "1" of the bit to be encoded on this period.

[ENCODER D] The fourth variant of encoder 1 is not illustrated. It includes a source supplying a continuous particle flow (single mode laser, etc.) Pulses of time width ΔT are chopped at frequency Tb in the continuous flow. They are produced by a pulse chopper 12 generating pulses either not shifted, or all shifted by t ($0 \leq t \leq Tb-\Delta T$). The structure of the pulse chopper 12 may, for example, be similar to that of the encoded pulse choppers $12^{+3}$ described above. The pulses are then shifted or not by a delay gate 13 (for example similar to that of the second variant of encoder 1). The pulses output from the delay gate 13 then carry the data to be transmitted according, for example, to the diagram on FIG. 1.

Once the data is encoded as pulses shifted or not by an encoder 1 including, for example, an encoded pulse chopper $12^{+3}$ on the particle flow from a continuous source 11, it must be attenuated. The probability that the decoder 3 represented on FIG. 10 detects two photons on the same pulse must be negligible. It is this principle which brings in the quantum dimension of the cryptography. The attenuator 2 is positioned after encoder 1 in the transmitter. It includes a half-wave plate 21 followed by a polarizer 22 which produces two beams: a "key" attenuated beam and a secondary beam. The intense beam leaving by the secondary channel can also be transmitted to the receiver. It is used, for example, to create a "sync" reference signal to synchronize the receiver clock. In particular, it is used to synchronize the decoder 3. The "sync" signal is transmitted either directly in optical format or as a microwave signal, etc.

A first variant of the decoder 3 shown on FIG. 11 (a) includes a photon counter 31' activated only during the observation windows shown on FIG. 2. Following the detection of a photon in the "key" quantum signal by the photon counter 31' in either of the observation windows, the decoder 3 decides whether a bit of value "0" or "1" has been transmitted. If the photon counter 31' does not detect any photons in either observation window, the decoder 3 decides that there is non-reception. It cannot determine whether this non-reception is due to poor quality transmission or to interception by a third party.

If the time width $\Delta T$ and the spectral width $\Delta v$ of the pulses transmitted satisfy the minimum state relation $\Delta v.\Delta T=1$, a second variant of the decoder 3 proposed by FIG. 11 (b) can be used. The laser 11 used to produce such pulses may be, for example, a mode-locked laser. The photons of the "key" quantum signal received are filtered by a filter 35 of spectral width $\Delta v$. The photons of spectral width $\Delta v$ are observed by the photon counter 31' activated on the observation windows shown on FIG. 2. The photons reflected by the filter $\Delta v$ are also counted by a particle counter 31''. The comparator 32 checks whether the number $N_{\Delta f}$ of reflected photons is greater than the number $N_{\Delta v}$ of photons observed in the observation windows. If this is the case, the decoder 3 decides that the data transmitted has been intercepted by a third party. Otherwise, depending on whether the photon counter 31' detects a photon in one or other of the observation windows, the decoder 3 decides whether a bit of value "0" or "1" has been transmitted. Lastly, if the photon counter 31' does not detect any photons in either observation window, the decoder 3 decides that there is non-reception. It cannot determine whether this non-reception is due to poor quality transmission or to interception by a third party.

Depending on the type of source (11, $11^{+2}$ etc.) used, for example a mode-locked laser, the pulse durations may then lie between 10 ps and 100 fs. These values of much less than the response times of some existing photon counters (typically 1 ns). In this case, the photon counter (31, 31') cannot distinguish between a shifted pulse and a non-shifted pulse, or between a pulse shifted by t0 and a pulse shifted by t1. This function can then be carried out by using, for example, an optical gate (not shown on the figures) upstream from the photon counter (31, 31'). This gate is electrically controlled It must be fast enough to produce detection gates of sufficiently short duration corresponding to the observation windows of FIG. 2 if the response time of the photon counter (31, 31') is too long.

The decoder 3 shown on FIGS. 11 (a) and 11 (b) therefore includes at least one photon counter 31' activated on the observation windows of FIG. 2. If the pulses transmitted by the transmitter have minimum state, the decoder can also include a filter of spectral width $\Delta v$ upstream from the photon counter 31'. It may also include a photon counter 31'' on the flow reflected by the filter $\Delta v$ and a comparator 32 receiving the number of particles detected by the photon counter 31' and photon counter 31'' which can detect the interception of the transmission by a third party.

FIG. 12 shows a second example of realization of the quantum cryptography transmission system with time encoding according to the invention. A pulse source $11^{+2}$ generates the particle flow as a train of pulses of time width $\Delta T$ and frequency Tb. For example, if the pulses are too short with respect to the switching time of a gate and/or for the shift to be detected by a photon counter 31', the transmission system or encoder 1 used may have the structure of an interferometer 17 as shown on FIG. 12. In this case, the delay gate 13 includes the separating element 14 of the interferometer 17. The particle flow is therefore split into two parts sent on the two arms of the interferometer 17. In one arm, the delay gate 13 may, for example, transmit or not the pulse in a delay line 18 of duration $\Delta T/2$ 16 (if t0=0, t1=T/2) depending on the data to be encoded. The particle flows are attenuated on the two arms by the attenuator 2 before being transmitted as "key" signal. The attenuator may, for example, use the secondary flow as "sync" synchronization signal to synchronize the transmitter with the receiver. The decoder 3 then transmits or not the pulse of the other interferometer arm into a delay line 19 of identical duration $\Delta T/2$ 16. If the delay gate 13 and the decoder 3 have chosen the same delay 0 or $\Delta T/2$, then the probability of detecting a photon is 100% in one of the output channels (channel a) and zero in the other channel (channel b). If the delay gate 13 and the decoder 3 have chosen different delays, then the probability of detecting a photon is 50% in each channel. The fact that the counter 31' detects a particle in channel b is used to determine with 100% probability the delay which was chosen by the delay gate 13. The particle counter 31' may, for example, be replaced by the device shown on FIG. 11 (b) if the pulses generated have minimum state.

An additional advantage of time ambiguity cryptography over polarization ambiguity cryptography is that the probability of the decoder 3 detecting a photon is greater when the decoder 3 uses two observation windows.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A digital data encoding method intended for transmission by particle flow, comprising the steps of:—
    transforming the sequence of K bits of digital data to a train of K pulses of particle of time width $\Delta T$ and whose frequency Tb, is predetermined knowing that each of the K pulses being shifted or not in time such that the $k^{th}$ pulse is shifted by a duration t0 respectively t1, with respect to the initial instant of the period depending on the value "0", respectively "1" of the $k^{th}$ bit, where k is an integer such that $0 \leq k < K$ and the shifts t0 and t1 are such that $0 \leq t0, t1 \leq Tb - \Delta T$ and $0 < |t1-t0| < \Delta T$ whereby the pulse time width shifted by t0 overlaps with the pulse time width shifted by t1 for an overlap time interval $\Delta t = \Delta T - |t1-t0|$.

2. The encoding method according to claim 1, wherein:
    the particle flow generated is a light flow, a photon flow, an electron flow or a positron flow;
    the shifts t0 and t1 satisfy one or more of the following relations:
    $t1 = t0 + \Delta T/2$ or $t0 = t1 + \Delta T/2$,
    $t0 = 0$ or $t1 = 0$;

the pulses have a spectral width Δv, and the time width ΔT and spectral width Δv of the pulses satisfy the following relation: Δv.ΔT=1;

the digital data has at least one encryption key.

3. A digital data encoder for use by a signal transmitter on particle flow comprising:
a device, called continuous source, generating a continuous particle flow;
a pulse chopper, chopping a train of pulses of time width ΔT and frequency Tb in the continuous particle flow to convert a sequence of K bits of digital data into a train of K pulses of particle of time width ΔT and whose frequency Tb, is predetermined; and
a delay gate, shifting the pulses chopped in the particle flow to match the values of the bits to be encoded knowing that each of the K pulses being shifted or not in time such that the $k^{th}$ pulse is shifted by a duration t0 respectively t1, with respect to the initial instant of the period depending on the value "0", respectively "1" of the $k^{th}$ bit, where k is an integer such that 0≦k<K and the shifts t0 and t1 are such that 0≦t0,t1≦Tb−ΔT and 0<lt1−t0l<ΔT whereby the pulse time width shifted by t0 overlaps with the pulse time width shifted by t1 for an overlap time interval Δt=ΔT−lt1−t0l.

4. A digital data encoder for use by a signal transmitter on particle flow comprising:
a pulse source, generating a particle flow as a train of pulses of time width ΔT and frequency Tb, and
a delay gate which converts the sequence of K bits of digital data into a train of K pulses of particle of time width ΔT and whose frequency Tb, is predetermined, and shifts the pulses in the particle flow to match the values of the bits to be encoded knowing that each of the K pulses being shifted or not in time such that the $k^{th}$ pulse is shifted by a duration t0 respectively t1, with respect to the initial instant of the period depending on the value "0", respectively "1" of the $k^{th}$ bit, where k is an integer such that 0≦k<K and the shifts t0 and t1 are such that 0≦t0,t1≦Tb−ΔT and 0<lt1−t0l<ΔT whereby the pulse time width shifted by to overlaps with the pulse time width shifted by t1 for an overlap time interval Δt=ΔT−lt1−t0l.

5. A digital data encoder for use by a signal transmitter on particle flow, comprising:
a continuous source, generating a continuous particle flow;
an encoded pulse chopper, chopping in the continuous particle flow a train of pulses to convert the sequence of K bits of digital data into a train of K pulses of particle of time width ΔT and frequency Tb with the appropriate time shift depending on the values of the bits to be encoded knowing that each of the K pulses being shifted or not in time such that the $k^{th}$ pulse is shifted by a duration t0 respectively t1, with respect to the initial instant of the period depending on the value "0", respectively "1" of the $k^{th}$ bit, where k is an integer such that 0≦k<K and the shifts t0 and t1 are such that 0≦t0,t1≦Tb−ΔT and 0<lt1−t0l<ΔT whereby the pulse time width shifted by t0 overlaps with the pulse time width shifted by t1 for an overlap time interval Δt=ΔT−lt1−t0l.

6. The encoder according to claim 3, wherein it has one or more of the following characteristics:
a source (11 or $11^{+2}$ or $11^{+3}$) generates a photon flow,
the time shifts t, t0 and t1 satisfy one or more of the following relations:
t1=t0+ΔT/2 or t0=t1+ΔT/2,
t0=0 or t1=0, the time width ΔT and the spectral width Δv of the pulses satisfy the following relation: Δv.ΔT=1;
the digital data has at least one encryption key.

7. A digital data transmitter including at least one digital data encoder for use on a particle flow, the encoder being configured to:
convert the sequence of K bits of digital data into a train of K pulses of particle of time width ΔT and whose frequency Tb, is predetermined knowing that each of the K pulses being shifted or not in time such that the $k^{th}$ pulse is shifted by a duration t0 respectively t1, with respect to the initial instant of the period depending on the value "0", respectively "1" of the $k^{th}$ bit, where k is an integer such that 0≦k<K and the shifts t0 and t1 are such that 0≦t0,t1≦Tb−ΔT and 0<lt1−t0l<ΔT whereby the pulse time width shifted by t0 overlaps with the pulse time width shifted by t1 for an overlap time interval Δt=ΔT−lt1−t0l, wherein the encoder is downstream from an attenuator.

8. A method to decode digital data encoded according to a method of claim 1, wherein,
the digital data is a train of K pulses converted from a sequence of K bits of digital data, of time width ΔT whose frequency Tb, is predetermined knowing that each of the K pulses being shifted or not in time such that the $k^{th}$ pulse is shifted by a duration t0 respectively t1, with respect to the initial instant of the period depending on the value "0", respectively "1" of the $k^{th}$ bit, where k is an integer such that 0≦k<K and the shifts t0 and t1 are such that 0≦t0,t1≦Tb−ΔT and 0<lt1−t0l<ΔT whereby the pulse time width shifted by t0 overlaps with the pulse time width shifted by t1 for an overlap time interval Δt=ΔT−lt1−t0l, the method comprising the steps of:
observing the flow of particles received on one or two time windows for each bit reception period of duration Tb,
if t0<t1, the first time observation window starts at instant t0 (inclusive) and ends at instant t1 (exclusive), the second observation window starts at instant t1+Δt (exclusive) and ends at instant t1+T (inclusive),
if t1<t0, the first time observation window starts at instant t1 (inclusive) and ends at instant t0 (exclusive), the second observation window starts at instant t0+Δt (exclusive) and ends at instant t0+T (inclusive),
detecting particles in the time observation window(s) and generating:
a bit of value "0":
if t0<t1, when a particle is detected in the window starting at t0 of period k,
if t1<t0, when a particle is detected in the window starting at t0+Δt of period k,
a bit of value "1":
if t1<t0, when a particle is detected in the window starting at t1 of period k,
if t0<t1, when a particle is detected in the window starting at t1+Δt of period k,
a signal indicating an ambiguity on the bit value if no particle was detected in the first and in the second observation window.

9. The decoding method according to claim 8, wherein, when the time width ΔT and the spectral width Δv of the pulses used by the encoding method satisfy the following relation: Δv.ΔT=1, it comprises one or more of the following steps:

a filtering step which only allows the particles of spectral width Δv to pass, carried out upstream from observation and detection;

a count of the number $N_{\Delta v}$ of particles received of spectral width equal to Δv, a count of the number $N_{\Delta f}$ of particles received of different spectral width Δf (Δf≠Δv) and a comparison of these two numbers $N_{\Delta v}$ and $N_{\Delta f}$ such that if $N_{\Delta v} < N_{\Delta f}$, the interception of particles by a third party is indicated.

10. A decoder of digital data encoded by an encoder of claim 3, wherein the digital data is a train of K pulses converted from a sequence of K bits of digital data, of time width ΔT whose frequency Tb, is predetermined knowing that each of the K pulses being shifted or not in time such that the $k^{th}$ pulse is shifted by a duration to respectively t1, with respect to the initial instant of the period depending on the value "0", respectively "1" of the $k^{th}$ bit, where k is an integer such that 0≦k<K and the shifts t0 and t1 are such that 0≦t0,t1<Tb−ΔT and 0<lt1−t0l<ΔT whereby the pulse time width shifted by to overlaps with the pulse time width shifted by t1 for an overlap time interval Δt=ΔT−lt1−t0l, and the decoder is configured to:

observe the flow of particles received on one of the two time windows of the bit reception period of duration Tb, if t0<t1, the first time observation window starts at instant to (inclusive) and ends at instant t1 (exclusive), the second observation window starts at instant t1+Δt (exclusive) and ends at instant t1+T (inclusive), if t1<t0, the first time observation window starts at instant t1 (inclusive) and ends at instant to (exclusive), the second observation window starts necessary, at instant to +Δt (exclusive) and ends at instant t0+T (inclusive), wherein the decoder includes a particle counter for detecting the presence or not of particles in the time observation window(s) and for generating:

a bit of value "0":
 if t0<t1, when a particle is detected in the window starting at t0 of period k,
 if t1<t0, when a particle is detected in the window starting at t0+Δt of period k, a bit of value "1":
 if t1<t0, when a particle is detected in the window starting at t1 of period k,
 if t0<t1, when a particle is detected in the window starting at t1+Δt of period k, a signal indicating an ambiguity on the bit value if no particle was detected in the first and in the second observation window.

11. The decoder according to claim 10, wherein the decoder comprises at least a first particle counter which only counts the particles present in the observation window(s) wherein, when the time width ΔT and the spectral width Δv of the pulses used by the encoder (1) satisfy the following relation: Δv.ΔT=1, it also comprises one or more of the following devices:

a filter which only allows the particles of spectral width Δv to pass to the first particle counter;

the first particle counter (31') generating the number $N_{\Delta v}$ of particles it detects, a second counter (31") generating the number $N_{\Delta f}$ of particles received by the decoder (3) and of spectral width Δf different from Δf≠Δv, a comparator (32) of these two numbers $N_{\Delta v}$ and $N_{\Delta f}$ such that if $N_{\Delta v} < N_{\Delta f}$, it generates a predetermined signal indicating either ambiguity of the bit value or interception of particles by a third party.

12. The transmitter of claim 9, further comprising a quantum cryptography to transmit an encryption key to a receiver synchronized with the transmitter due to the secondary beam transmitted by the transmitter.

13. A digital data encoding method according to claim 1, wherein the shifts t0 and t1 satisfy one or more of the following relations:

$t1=t0+\Delta T/2$ or $t0=t1+\Delta T/2$, $t0=0$ or $t1=0$.

14. A digital data encoding method according to claim 1, wherein the time width ΔT and the spectral width Δv of the pulses satisfy the following relation: Δv.ΔT=1.

15. A digital data encoding method according to claim 1, wherein the digital data has at least one encryption key.

16. The encoder according to claim 3, further comprising a pulse chopper, chopping a train of pulses of time width ΔT and frequency Tb in the continuous particle flow.

17. The encoder according to claim 16, further comprising a delay gate, shifting pulses chopped in the particle flow to match the values of the bits to be encoded.

18. The encoder according to claim 3, wherein it has one or more of the following characteristics:

the source (11 or $11^{+2}$ or $11^{+3}$) generates a photon flow.

the time shifts t, t0 and t1 satisfy one or more of the following relations:

$t1=t0+\Delta T/2$ or $t0=t1+\Delta T/2$, $t0=0$ or $t1=1$, the time width ΔT and the spectral width Δv of the pulses satisfy the following relation: Δv.ΔT=1;

the digital data has at least one encryption key.

19. A decoder of digital data encoded by an encoder of claim 4, wherein the digital data is a train of K pulses converted from a sequence of K bits of digital data, of time width ΔT whose frequency Tb, is predetermined knowing that each of the K pulses being shifted or not in time such that the $k^{th}$ pulse is shifted by a duration to respectively t1, with respect to the initial instant of the period depending on the value "0", respectively "1" of the $k^{th}$ bit, where k is an integer such that 0≦k<K and the shifts t0 and t1 are such that 0≦t0,t1<Tb−ΔT and 0<lt1−t0l<ΔT whereby the pulse time width shifted by to overlaps with the pulse time width shifted by t1 for an overlap time interval Δt=ΔT−lt1−t0l, and the decoder is configured to:

observe the flow of particles received on one of the two time windows of the bit reception period of duration Tb, if t0<t1, the first time observation window starts at instant to (inclusive) and ends at instant t1 (exclusive), the second observation window starts at instant t1+Δt (exclusive) and ends at instant t1+T (inclusive), if t1<t0, the first time observation window starts at instant t1 (inclusive) and ends at instant to (exclusive), the second observation window starts at instant t0+Δt (exclusive) and ends at instant t0+T (inclusive), wherein the decoder includes a particle counter for detecting the presence or not of particles in the time observation window(s) and for generating:

a bit of value "0":
 if t0<t1, when a particle is detected in the window starting at t0 of period k,
 if t1<t0, when a particle is detected in the window starting at to +Δt of period k, a bit of value "1":
  if t1<t0, when a particle is detected in the window starting at t1 of period k,
  if t0<t1, when a particle is detected in the window starting at t1+Δt of period k,
a signal indicating an ambiguity on the bit value if no particle was detected in the first and in the second observation window.

20. A decoder of digital data encoded by an encoder of claim 5, wherein the digital data is a train of K pulses converted from a sequence of K bits of digital data, of time width ΔT whose frequency Tb, is predetermined knowing that each of the K pulses being shifted or not in time such that the $k^{th}$ pulse is shifted by a duration to respectively t1, with respect to the initial instant of the period depending on the value "0", respectively "1" of the $k^{th}$ bit, where k is an integer such that 0≦k<K and the shifts t0 and t1 are such that 0≦t0,t1<Tb−ΔT and 0≦|t1−t0|<ΔT whereby the pulse time width shifted by to overlaps with the pulse time width shifted by t1 for an overlap time interval Δt=ΔT−|t1−t0|, and the decoder is configured to:
  observe the flow of particles received on one of the two time windows of the bit reception period of duration Tb,
    if t0<t1, the first time observation window starts at instant t0 (inclusive) and ends at instant t1 (exclusive), the second observation window starts at instant t1+Δt (exclusive) and ends at instant t1+T (inclusive),
    if t1<t0, the first time observation window starts at instant t1 (inclusive) and ends at instant to (exclusive), the second observation window starts at instant to +Δt (exclusive) and ends at instant t0+T (inclusive),
  wherein the decoder includes a particle counter for detecting the presence or not of particles in the time observation window(s) and for generating:

a bit of value "0":
  if t0<t1, when a particle is detected in the window starting at t0 of period k,
  if t1<t0, when a particle is detected in the window starting at t0+Δt of period k,
a bit of value "1":
  if t1<t0, when a particle is detected in the window starting at t1 of period k,
  if t0<t1, when a particle is detected in the window starting at t1+Δt of period k,
a signal indicating an ambiguity on the bit value if no particle was detected in the first and in the second observation window.

21. The encoder according to claim 4, wherein:
a source (11 or 11$^{+2}$ or 11$^{+3}$) generates a photon flow,
the time shifts t, t0 and t1 satisfy one or more of the following relations:

$t1 = t0 + \Delta T/2$ or $t0 = t1 + \Delta T/2$, $t0 = 0$ or $t1 = 0$, the time width ΔT and the spectral width Δv of the pulses satisfy the following relation: Δv.ΔT=1;
the digital data has at least one encryption key.

22. The encoder according to claim 5, wherein:
a source (11 or 11$^{+2}$ or 11$^{+3}$) generates a photon flow,
the time shifts t, t0 and t1 satisfy one or more of the following relations:

$t1 = t0 + \Delta T/2$ or $t0 = t1 + \Delta T/2$, $t0 = 0$ or $t1 = 0$, the time width ΔT and the spectral width Δv of the pulses satisfy the following relation: Δv.ΔT=1;
the digital data has at least one encryption key.

* * * * *